US007451015B2

(12) United States Patent
Mazur et al.

(10) Patent No.: US 7,451,015 B2
(45) Date of Patent: Nov. 11, 2008

(54) SYSTEM AND METHOD FOR DISPENSING BULK PRODUCTS

(75) Inventors: Gregory Mazur, Hopkinton, MA (US); Kenneth Sears, Newburyport, MA (US)

(73) Assignee: Buy The Pound, Inc., Hopkinton, MA (US)

( * ) Notice: Subject to any disclaimer, the term of this patent is extended or adjusted under 35 U.S.C. 154(b) by 0 days.

(21) Appl. No.: 11/824,068

(22) Filed: Jun. 29, 2007

(65) Prior Publication Data

US 2007/0255450 A1 Nov. 1, 2007

Related U.S. Application Data

(63) Continuation-in-part of application No. 10/972,612, filed on Oct. 25, 2004, now abandoned.

(60) Provisional application No. 60/513,867, filed on Oct. 23, 2003.

(51) Int. Cl.
*G06F 17/00* (2006.01)

(52) U.S. Cl. ........................ 700/239; 700/235; 700/240

(58) Field of Classification Search ................. 700/233, 700/239, 240, 235
See application file for complete search history.

(56) References Cited

U.S. PATENT DOCUMENTS

| | | | | |
|---|---|---|---|---|
| 3,413,052 | A | 11/1968 | Schoenmakers | |
| 4,232,798 | A | 11/1980 | Hammel et al. | |
| 4,900,200 | A * | 2/1990 | Harumoto et al. | 406/93 |
| 5,522,309 | A | 6/1996 | Mizobuchi et al. | |
| 5,596,179 | A * | 1/1997 | Sakaeda | 177/25.18 |
| 5,685,435 | A * | 11/1997 | Picioccio et al. | 222/189.02 |
| 5,731,981 | A | 3/1998 | Simard | |
| 5,971,205 | A * | 10/1999 | Michaels et al. | 221/135 |
| 5,988,935 | A * | 11/1999 | Dillingham | 404/79 |
| 6,000,444 | A * | 12/1999 | Ishikawa et al. | 141/83 |
| 6,351,687 | B1 | 2/2002 | Snider et al. | |
| 6,360,138 | B1 * | 3/2002 | Coppola et al. | 700/231 |
| 6,516,245 | B1 * | 2/2003 | Dirksing et al. | 700/233 |
| 6,827,529 | B1 * | 12/2004 | Berge et al. | 222/56 |

* cited by examiner

*Primary Examiner*—Gene O. Crawford
*Assistant Examiner*—Timothy R Waggoner
(74) *Attorney, Agent, or Firm*—Devine Millimet & Branch PA; Paul C. Remus; Raymond I. Bruttomesso, Jr.

(57) ABSTRACT

A dispensing system and method is used to dispense a bulk product or to mix and to dispense bulk products on site and to price the products according to the quantity and distribution thereof. The dispensing system preferably provides automated merchandising by providing up-to-date product information and by allowing customers to select and purchase one or more bulk products. The dispensing system can be located indoors or outdoors and is preferably designed for self-service and cash less transactions.

20 Claims, 9 Drawing Sheets

SYSTEM AND METHOD FOR DISPENSING BULK PRODUCTS

CROSS REFERENCE TO RELATED APPLICATIONS

The present application is a continuation-in-part of U.S. patent application Ser. No. 10/972,612 filed on Oct. 25, 2004 now abandoned which claims the benefit of Provisional Patent Application Ser. No. 60/513,867 filed Oct. 23, 2003, which is incorporated herein by reference.

TECHNICAL FIELD

The present invention relates to dispensing products and more particularly, to a system and method that mixes and dispenses bulk products.

BACKGROUND INFORMATION

Consumer bulk products, such as liquid and granular products, are typically prepackaged and stacked on shelves or prepackaged and delivered via a vending machine. Consumer education concerning such bulk products usually depends on package labels, advertising, or trained store personnel. The marketing and distribution of such prepackaged bulk products, including bulk pet foods, has presented numerous challenges. The heavy and cumbersome nature of such prepackaged bulk products has created costly problems throughout the distribution channel (i.e., the manufacturer, distributor, and retailer). Ultimately, these problems result in higher prices for consumers.

Distribution channel problems are first incurred by manufacturers. The manufacturers typically must produce packages in sizes that fit on retailer shelves and conform to a certain shape, thus requiring custom packaging equipment. The manufacturers also must design packages to be attractive and functional to the consumer. Manufacturers selling directly into the retail channel must also deliver packages in quantities that can be readily inventoried and merchandised.

Distribution channel problems are also incurred by distributors. The distributors typically must break bulk products into quantities acceptable for retail if it has not been done by the manufacturer. This activity requires labor to pick and pack the bulk product. Also, given the nature of certain bulk products if they are prepackaged, the packaging may become worn and ripped as it moves through the distribution channel. As a result, the product does not appear new and is often returned. Thus, the packaging used to prepackage bulk products must be provided in different sizes and must be durable enough to withstand storage and handling.

Additional problems in the distribution channel are incurred by retailers. The retailer often must break down blended pallets of packages, check in the packages, remove all damaged packages, and price tag individual packages. Inadequate stock rotation and improper handling of the packages can damage the packaging and degrade the quality of the bulk products contained therein. All of these problems increase the cost of the prepackaged bulk products.

In addition to creating higher prices for consumers, a consumer's choices are limited to those package sizes that the manufacturers, distributors, and retailers make available. Most bulk products come in standard-sized packages and do not always fit the needs of the consumer. Thus, the consumer's purchasing decisions are limited, and the consumer cannot customize the product.

Consumers also do not receive adequate education about prepackaged bulk products. Retail store personnel are often not properly trained to give a customer the information needed about such products to make informed purchasing decisions. The information printed on the packages is often difficult to read when the packages are on the shelves. Moreover, the product information printed on the prepackaged bulk products is static and cannot be changed or updated after the product has been packaged and sent to the store. The presentation of the packages by the store can also mislead the consumer and prevent the consumer from making an informed purchasing decision.

Accordingly, there is a need for a dispensing system and method for use by a consumer in purchasing bulk products that allows the consumer to learn about bulk products, to customize both the quantity and type of bulk product or mix of bulk products being purchased, and to obtain quality bulk products.

SUMMARY

Unfortunately, there are deficiencies in conventional methods of distribution and delivery of bulk products to the consumer that lead to higher cost and/or poor quality. Furthermore, the information provided to the consumer regarding the product is generally lacking.

In contrast to the above-described conventional methods of distributing bulk products, the system of dispensing bulk products has a volumetric escapement metering device for measuring the bulk product, a vacuum delivery system, and a blending/filling mechanism to take the individual bulk products located in separate containers and mix them and deliver the mixture to the consumer as desired by consumer. Furthermore, the system has user interface of a combination of a touch screen and a printer to provide information on the product to the customer.

One preferred embodiment of the present dispensing system includes a plurality of inventory containers for storing different bulk products. It also includes a user interface for displaying information on the stored bulk products and for receiving a customer's selection of specified quantities of one or more of the stored mixed bulk products. A selective dispensing means is coupled to each of the inventory containers for selectively dispensing a measured quantity of the bulk product stored in the inventory container. A computer responsive to the user interface controls the dispensing means based on the customer's selections. A transporting means is coupled to the dispensing means for transporting the dispensed quantities of bulk products to a blending/filling means for blending the dispensed quantities of bulk products and for filling a container with the dispensed quantities of bulk products. A measuring means then measures the dispensed quantities of bulk products to determine the aggregate price thereof.

In one embodiment, a system for dispensing bulk products has at least two inventory containers for storing at least two bulk products. A user interface displays information on the stored bulk products and is capable of receiving a customer's selection of specified quantities of one or more of the stored bulk products. The system has at least two selective dispensing devices; each device is coupled to one inventory container, for selectively dispensing a specified quantity of the bulk product stored in the inventory container. A controller is coupled to the user interface and controls the dispensing device to dispense the customer's selection of specified quantities of one or more of the stored bulk products. A vacuum transporting mechanism is coupled to the dispensing device for transporting by the flow of air the specified quantities of one or more of the stored bulk products. A blending/filling mechanism is coupled to the vacuum transporting mechanism for blending the customer's selection of more than one of the stored bulk products and filling a container with the specified quantities of one or more of the stored bulk products. A measuring device is coupled to the controller for measuring the specified quantities of one or more of the stored bulk products in the container to determine the price thereof.

One preferred embodiment of the present method of dispensing bulk products includes the steps of storing one or more bulk products in individual containers and displaying product information on the stored bulk products; receiving a customer's selection of specified quantities of one or more of the stored bulk products; and conveying the customer's selection to a computer that controls the dispensing of the stored bulk products. The embodiment includes the further steps of dispensing the specified quantities of one or more of the bulk products as selected by the customer; transporting the specified quantities of one or more of the bulk products; filling a container with the specified quantities of one or more of the bulk products; and measuring the specified quantities of one or more of the bulk products to determine a price thereof depending upon the weight and distribution thereof.

According to another preferred embodiment of the present method of dispensing bulk products, the method further comprises the step of blending the mix of specified quantities of selected bulk products before filling the container. Another further preferred embodiment of the present method comprises the step of storing product information describing the specified quantities of one or more of the bulk products selected by the customer.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

A bulk product dispensing system utilizes a volumetric escapement metering device for measuring the bulk product, a vacuum delivery system, and a blending/filling mechanism to take the individual bulk products that were located in separate containers and mix the individual bulk products to form the blended product. The use of the metering device, the delivery system, and the blending/filling mechanism allows for a precise and accurate dispensing of a variety of products. Furthermore, the system has a user interface of a combination of a touch screen and a printer to provide product information to the customer. Accordingly, the bulk product is dispensed to the consumer in a more effective manner with the consumer better informed.

Figure 1:
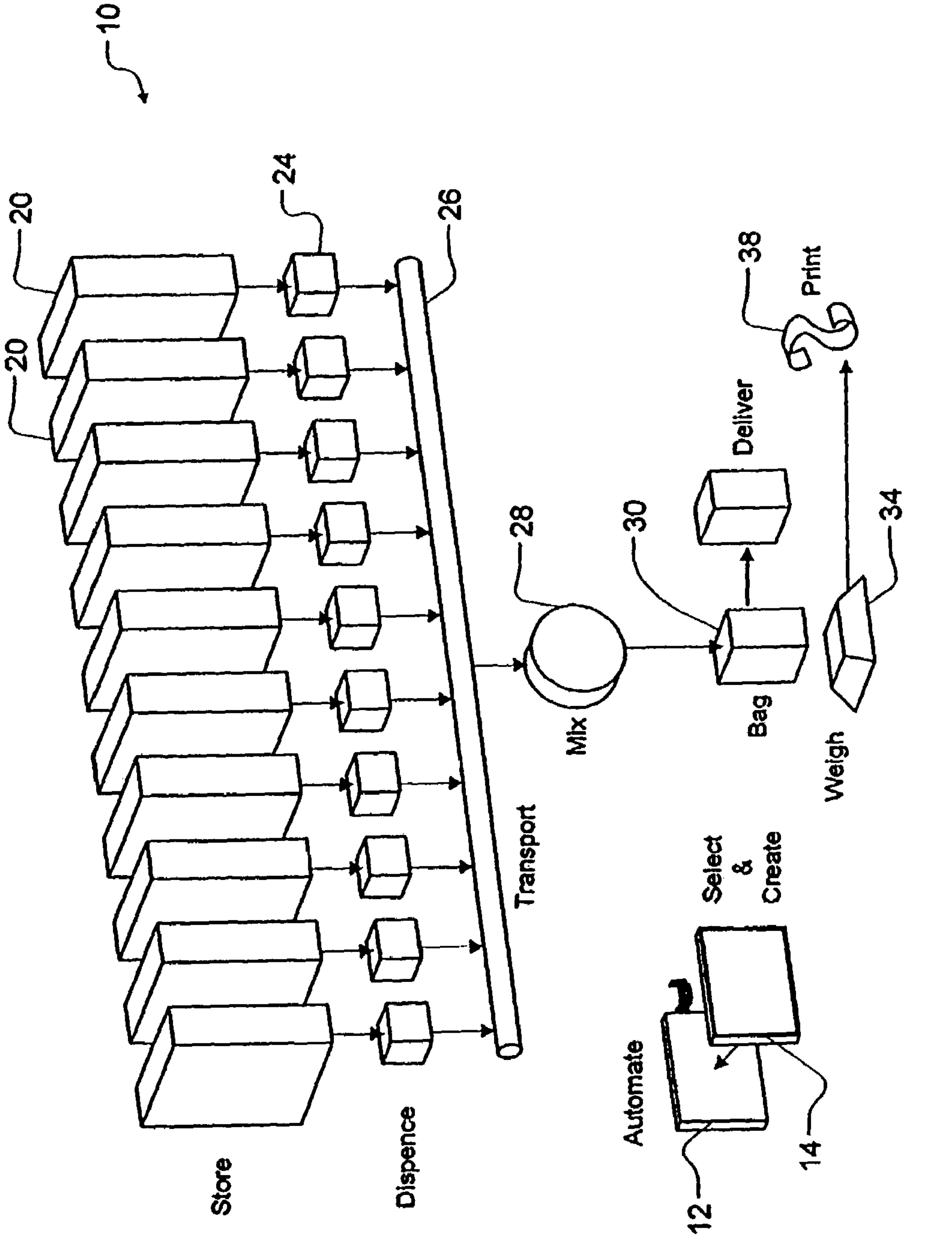
FIG. 1 is a functional block diagram illustrating a dispensing system, according to one embodiment of the present invention.

Referring to FIG. 1, a preferred embodiment of a bulk product dispensing system 10 is described. The preferred embodiment of the system 10 is used to select specified quantities of one or more of certain stored bulk products, to dispense such bulk products on site, and to price the dispensed bulk products. The price of the dispensed bulk products may depend on the distribution of the bulk products and the quantities of the bulk products, measured by weight or volume. The system 10 preferably provides automated merchandising by providing up-to-date product information on the bulk products it dispenses and by allowing customers to select and purchase a bulk product or to create and purchase customized mixes of bulk products. The dispensing system 10 can be located indoors or outdoors and is preferably designed for self-service and cash less transactions. In the preferred embodiment, the bulk products are granular products including, but not limited to, bird seed, pet food, nuts, coffee, fertilizers, and grass seed. The bulk products can also be liquid products or any other product capable of being stored in bulk, blended, and dispensed.

Referring still to FIG. 1, the preferred embodiment of the dispensing system 10 includes a computer 12 for storing product and customer information and a user interface 14 for interacting with customers. The computer 12, which can be a PC or Apple personal computer or any other dedicated processing system, includes a database for storing product and inventory data related to the bulk products to be dispensed by the system and customer data related to the customers purchasing the bulk products. The computer 12 also calculates the price of the dispensed bulk products based on the distribution and quantity thereof. The computer system 12 also controls and monitors the operation of the dispensing system 10. Alternatively, the computer system 12 may be replaced by an electromechanical controller (not shown) of a type known to those skilled in the art for controlling the operation of the dispensing system 10.

The user interface 14 provides product information and advertising and marketing messages concerning the bulk products to be dispensed directly to the customer at the point of sale. The user interface 14 also allows the customer to select the bulk product, or mixed bulk products, to be dispensed and the quantity thereof. One embodiment of the user interface 14 is an interactive color monitor providing a touch screen graphical user interface (GUI). Other forms of user interfaces are also contemplated, including a monitor and keyboard and other user interfaces known to persons skilled in the art. The user interface 14 can also include a payment interface for receiving payment from the customer, for example, in the form of cash or cashless forms of payment such as debit cards, credit cards, or smart cards.

In the preferred embodiment of the dispensing system 10, the computer system 12 is connected by either a wireless or wired connection to a network (e.g., the Internet) to allow remote access to the dispensing system 10 by customers or the operator of the dispensing system 10. Using the network, the computer system 12 can download updated product information, advertising messages, promotions, and new pricing. The computer system 12 can also be accessed over the network to obtain customer information, for example, to track a customer's purchases per location for creating a customer loyalty program. The computer system 12 can also be accessed over the network to check inventory and system status.

Referring still to FIG. 1, the preferred embodiment of the dispensing system 10 also includes one or more inventory containers 20 for storing one or more bulk products. The dispensing system 10 also includes one or more selective dispensing means 24 such that one dispensing means 24 is coupled to each of the inventory containers 20 selectively to dispense a quantity of bulk product from the inventory container 20 based upon the quantity of bulk product or quantities of bulk products selected by a customer. A transporting means 26 transports the bulk product or bulk products dispensed from the selective dispensing means 24 to a blending/filling means 28, which are combined in this exemplary embodiment but may be separate means in other embodiments. If more than one bulk product is dispensed from the dispensing means 24, the blending means 28 mixes the plurality of bulk products to form a desired mix of bulk products. The blending/filling means 28 then fills a container 30 (e.g., a bag) with the bulk product or bulk products. A measuring means 34 measures the bulk product or bulk products in the container to determine the price. The measuring means may be a simple spring scale or other means known to those skilled in the art for measuring bulk products by weight or by volume. In one embodiment, the measuring means is a weighing device such as an electronic scale. A printer 38 prints out a receipt, coupons, and, if desired, product information. The selective dispensing means 24, the transporting means 26, the blending/filling means 28, the measuring means 34, and the printer 38 are all controlled by the computer 12.

Figure 2:
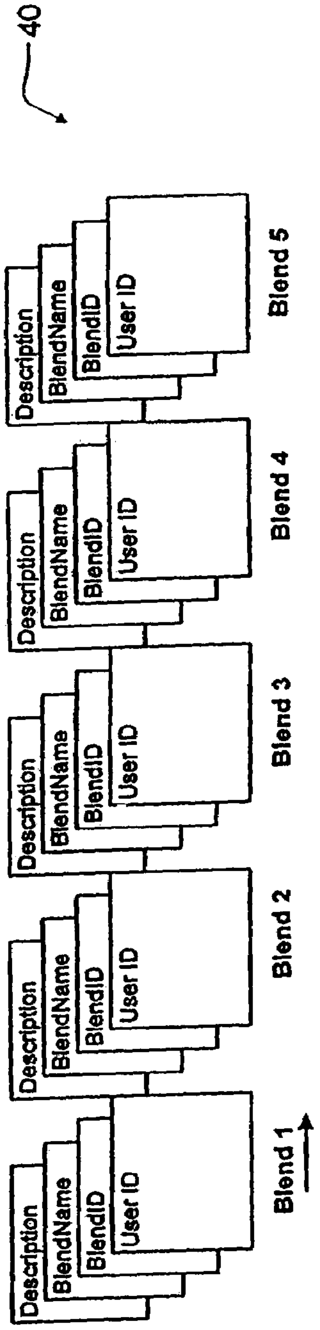
FIGS. 2-4 are schematic block diagrams of matrices representing product and inventory data stored in a database of the dispensing system, according to one embodiment of the present invention.

Referring then to FIGS. 2-5, examples of the product and inventory data that can be stored in the database of the computer 12 in another preferred embodiment of the dispensing system 10 are described in greater detail. As shown in FIG. 2, the database can include store mix data 40 defining one or more predefined bulk product mixes (e.g., defined by the operator of the dispensing system 10). The mix data 40 includes an identifier or identification code for the user who created the mix (e.g., UserID), an identifier or identification code for the mix (e.g., a BlendID), a name for the mix (e.g., BlendName), and a description of the bulk products contained in the mix (e.g., Description). This store mix data 40 is typically entered by the operator of the dispensing system 10.

Figure 3:
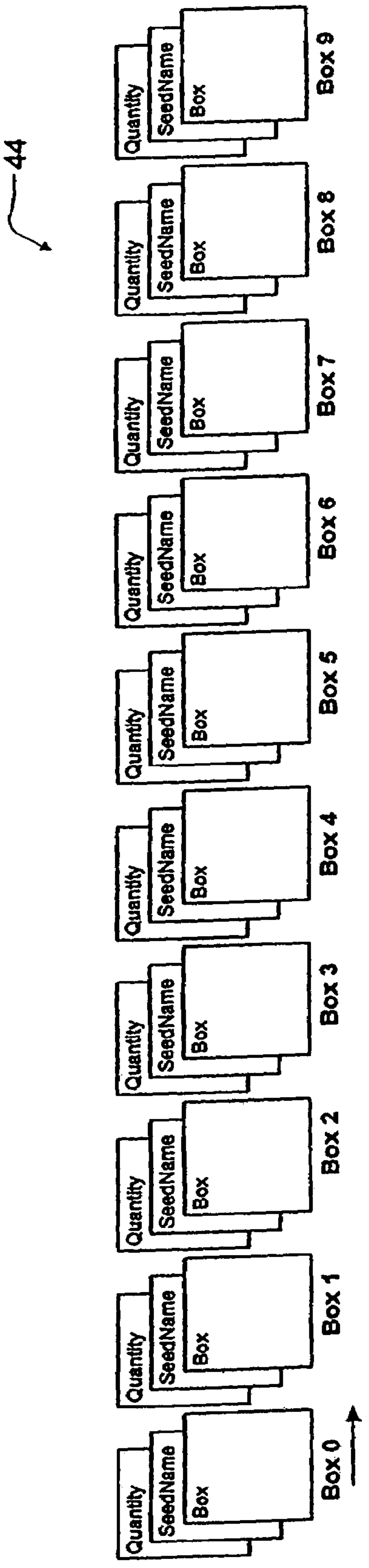

As shown in FIG. 3, the database can include inventory data 44 describing the bulk product stored in each inventory container 20. The inventory data 44 includes an identifier for the inventory container (e.g., the box or bin number), an identifier for the bulk product stored in the container (e.g., the SeedName), and a quantity of product in the inventory container (e.g., Quantity). This inventory data 40 is typically entered by the operator of the system 10. The quantity of product in the inventory containers 20 can also be monitored automatically.

Figure 4:
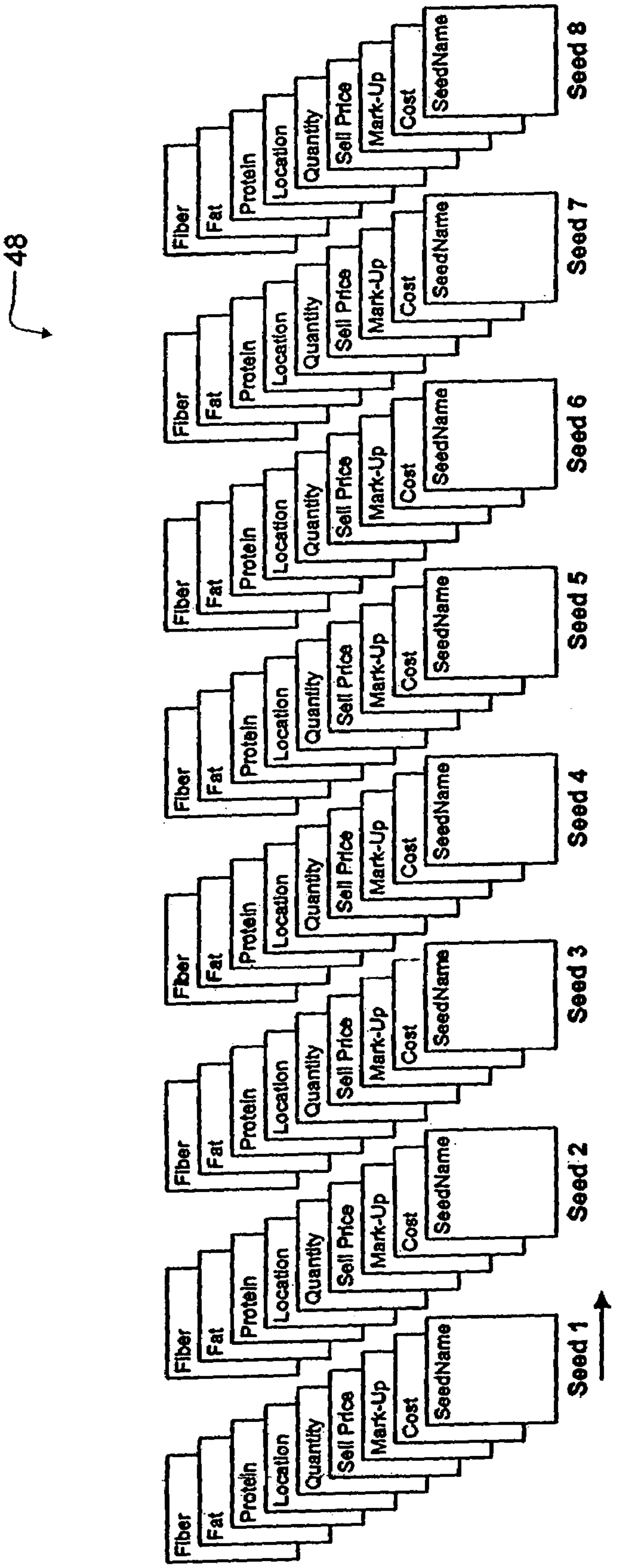

As shown in FIG. 4, the database can include product data 48 describing the specific bulk products in detail. In one exemplary embodiment where the product is bird seed, the product data 48 includes data defining characteristics of the seed, such as the seed name, cost, mark-up, sell price, quantity, location, protein content, fat content, and fiber content. This product data 48 is typically entered by the operator of the dispensing system 10. It is recognized that the product data can be entered via a network such as the internet from the supplier of the bulk products.

Figure 5:
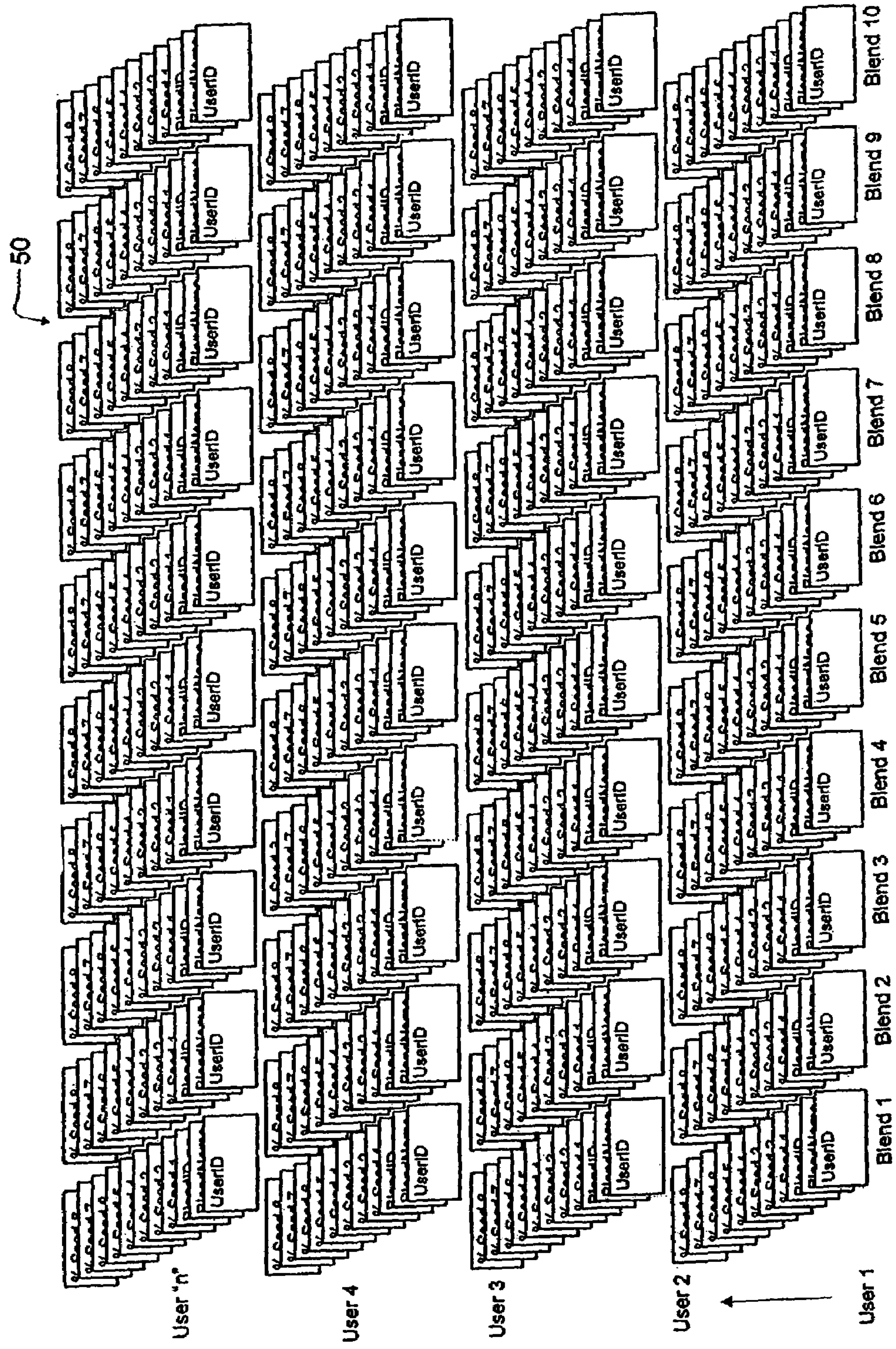
FIG. 5 is a schematic block diagram of a matrix representing customized product data stored in a database of the dispensing system, according to one embodiment of the present invention.

As shown in FIG. 5, the database can include custom mix data 50 describing custom mixes created by customers. In one exemplary embodiment where the product is bird seed, the custom mix data 50 includes a user identifier, a name for the mix, a mix identifier, and the percentages of the different types of seeds used in the mix. When a customer creates a custom mix using the dispensing system 10, the customer has the option of storing the custom mix data 50. Alternatively, the customer can create a customer mix at a remote location and upload the custom mix data 50 to the database in the computer 12 on the dispensing system 10. The dispensing system 10 can provide various information regarding the custom mix either on a display, such as the user interface 14, or in writing, such as from the printer 38, including protein content, fat content, price of mix per volume, price of mix per pound.

Figure 6:
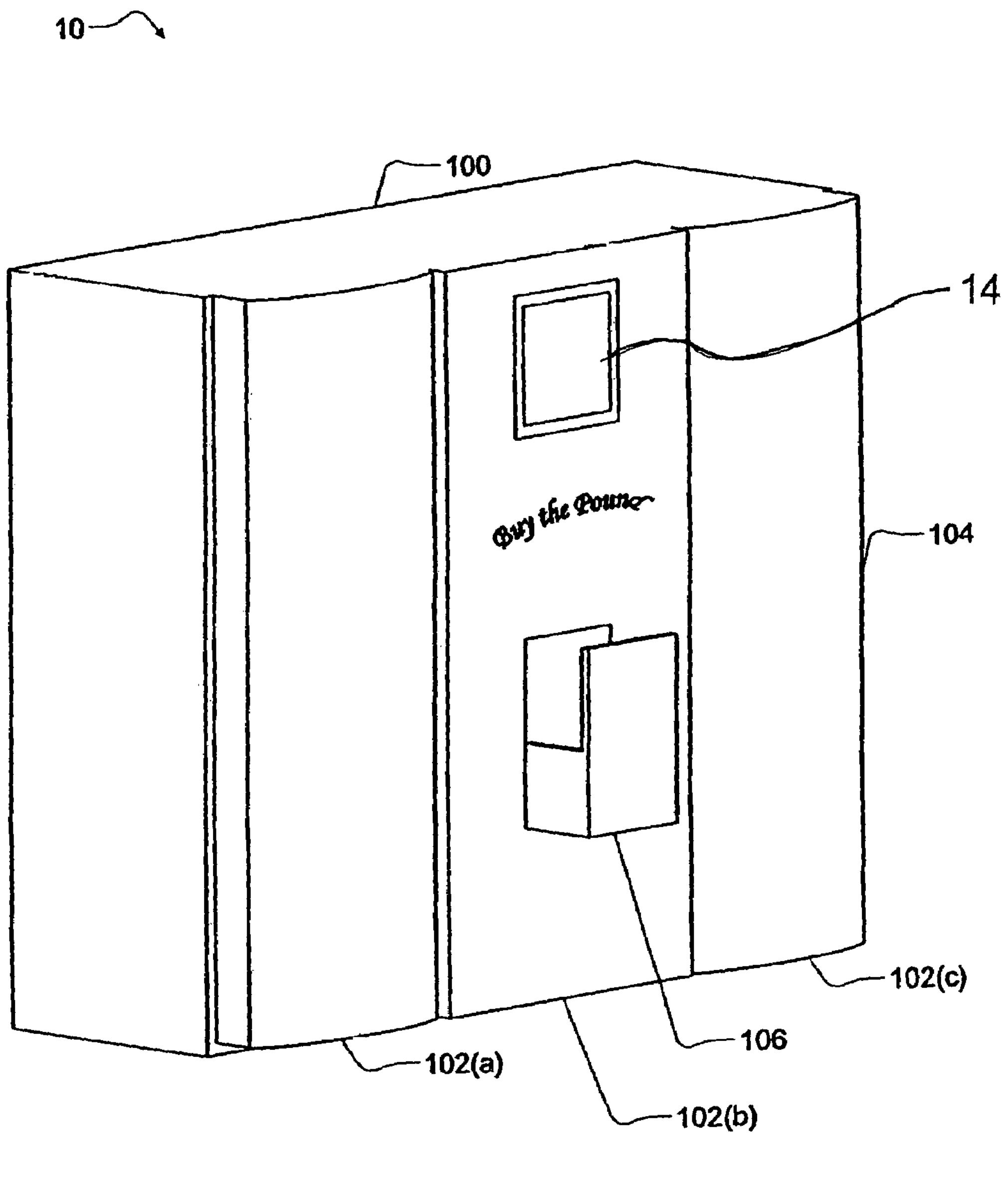
FIG. 6 is a perspective view of the outside of one embodiment of the dispensing system, according to one embodiment of the present invention.

Referring to FIGS. 6-11, a preferred embodiment of the dispensing system 10 is shown and described in greater detail. As shown in FIG. 6, the dispensing system 10 is enclosed in a housing 100 having door panels 102*a-c*. The housing 100 is preferably designed for durability, especially for systems that are used outside in potentially extreme environmental conditions. The housing is also preferably designed for easy access and replacement of the electronic and mechanical parts housed therein.

In addition, the housing 100 preferably includes a container dispenser 104 for dispensing containers, such as bags, and a container holder 106 for holding the container during filling. One embodiment of the container holder 106 is an automatic delivery drawer including bag sensors to indicate proper bag installation. The user interface 14 can be built into one of the door panels 102*a-c* in a location that is easily accessible to customers.

Figure 7:
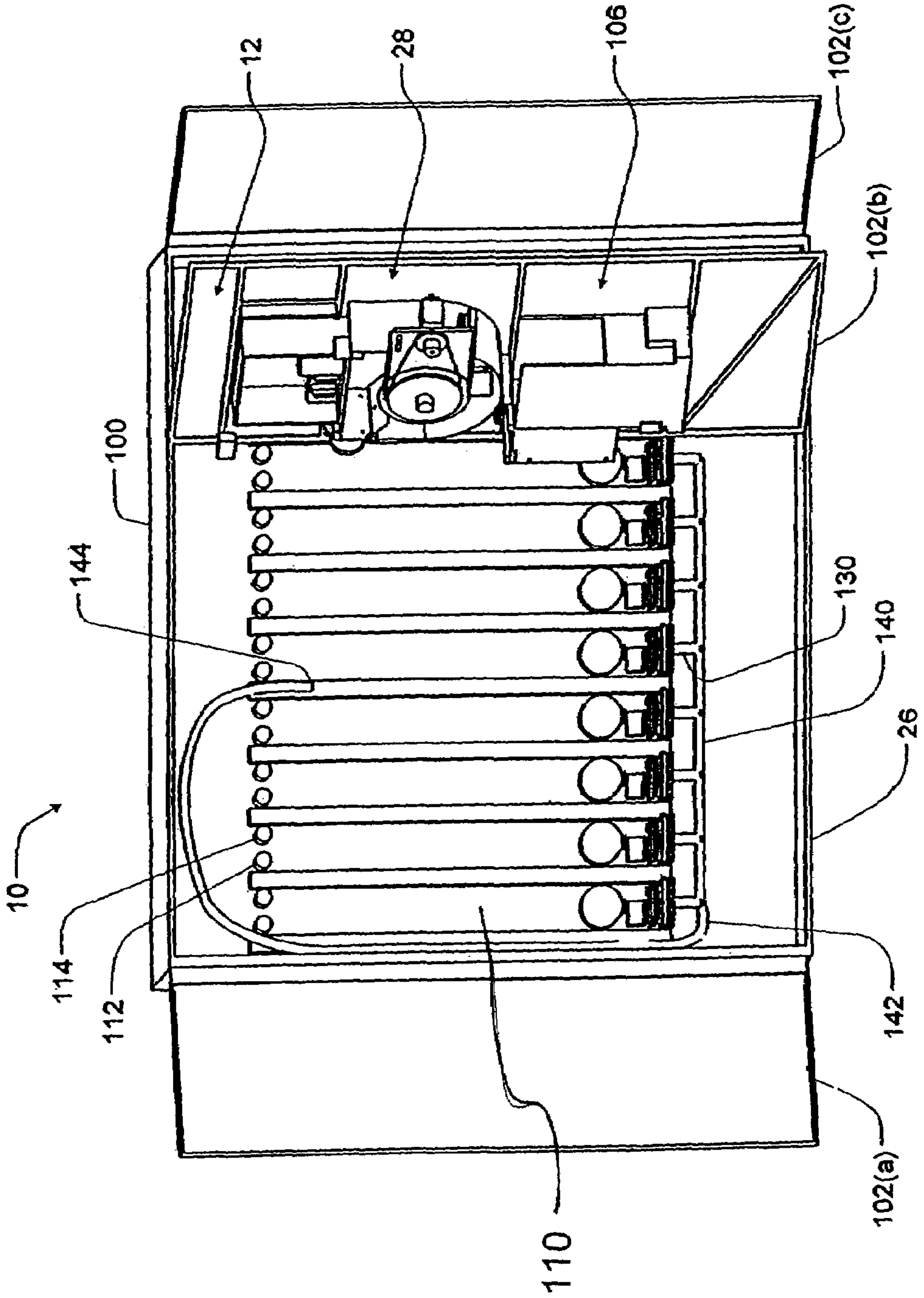
FIG. 7 is a schematic diagram of the dispensing system, according to one embodiment of the present invention.

As shown in FIG. 7, one embodiment of the inventory containers 20 is individual storage bins 110 located within the housing 100 for storing the bulk products to be dispensed. The storage bins 110 are preferably configured to facilitate the feeding of the bulk products downward by gravity. Other shapes and configurations are also contemplated. In one example used for bird seed, the system 10 includes ten storage bins 110, each having a 4.7 cubic foot storage capacity. Each of the storage bins 110 also preferably includes one or more hose ports 112, 114 for loading the storage bin with bulk product by way of a vacuum device. The storage bins 110 are preferably made of stainless steel when storing food products but can also be made of other suitable materials. The storage bins 110 can also be temperature controlled and humidity controlled as needed to preserve the quality of the bulk products being stored. In this embodiment, the selective dispensing mechanisms 24 are located at a bottom region of each of the storage bins 110 such that gravity or other means feed the bulk products to the dispensing mechanisms 24.

Figure 8:
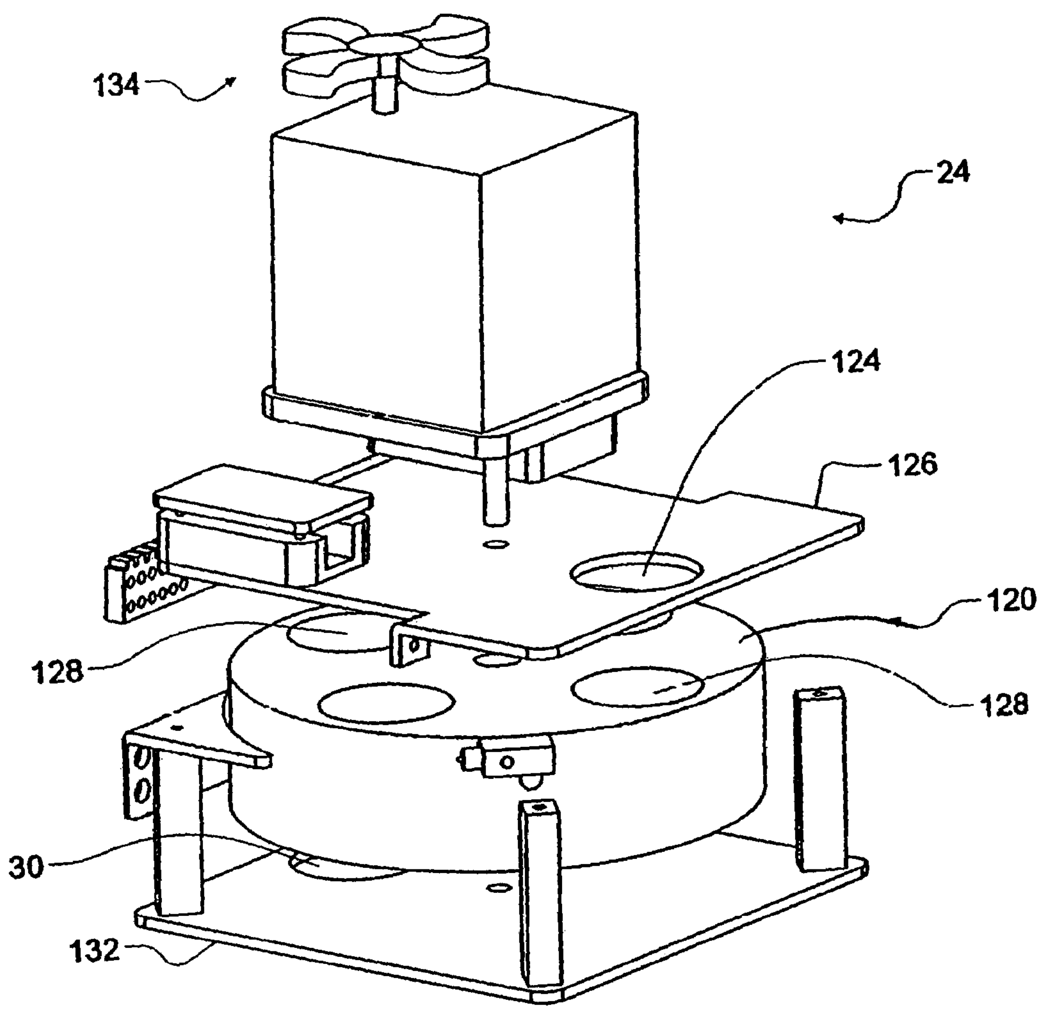
FIG. 8 is a schematic diagram of a dispensing means including a metering device used in the dispensing system shown in FIG. 7.

As shown in FIG. 8, one embodiment of a selective dispensing means 24 is a volumetric escapement metering device 120. The volumetric escapement metering device 120 receives the bulk product from the inventory container to which it is attached through an aperture 124 in a top plate 126 and into a measuring compartment 128 having a predefined volume. The metering device 120 rotates to dispense the measured quantity (i.e., dose) of bulk product through an aperture 130 in a bottom plate 132. The total quantity of bulk product dispensed is controlled by the rotation of the metering device 120. An electric motor 134 controlled by the computer 12, shown in FIG. 1, is used to rotate the volumetric escapement metering device 120. Other embodiments of a selective dispensing means 24 for measuring bulk products by volume or by weight that are known to those skilled in the art are also contemplated. It is recognized that the control of the metering device 120 can be calibrated as necessary to account for seasonal variation in the bulk products.

As shown in FIGS. 7-8, one embodiment of the transporting means 26 is a collection manifold 140 coupled to each of the apertures 130 in the metering devices 120 and a collection vacuum hose 142. The collection vacuum hose 142 has one end 144 that is connected to the blending/filling mechanism 28. Other embodiments of the transporting means 26 that are known to those skilled in the art for transporting bulk products, including without limitation, conveyor belts, are also contemplated.

Figure 9:
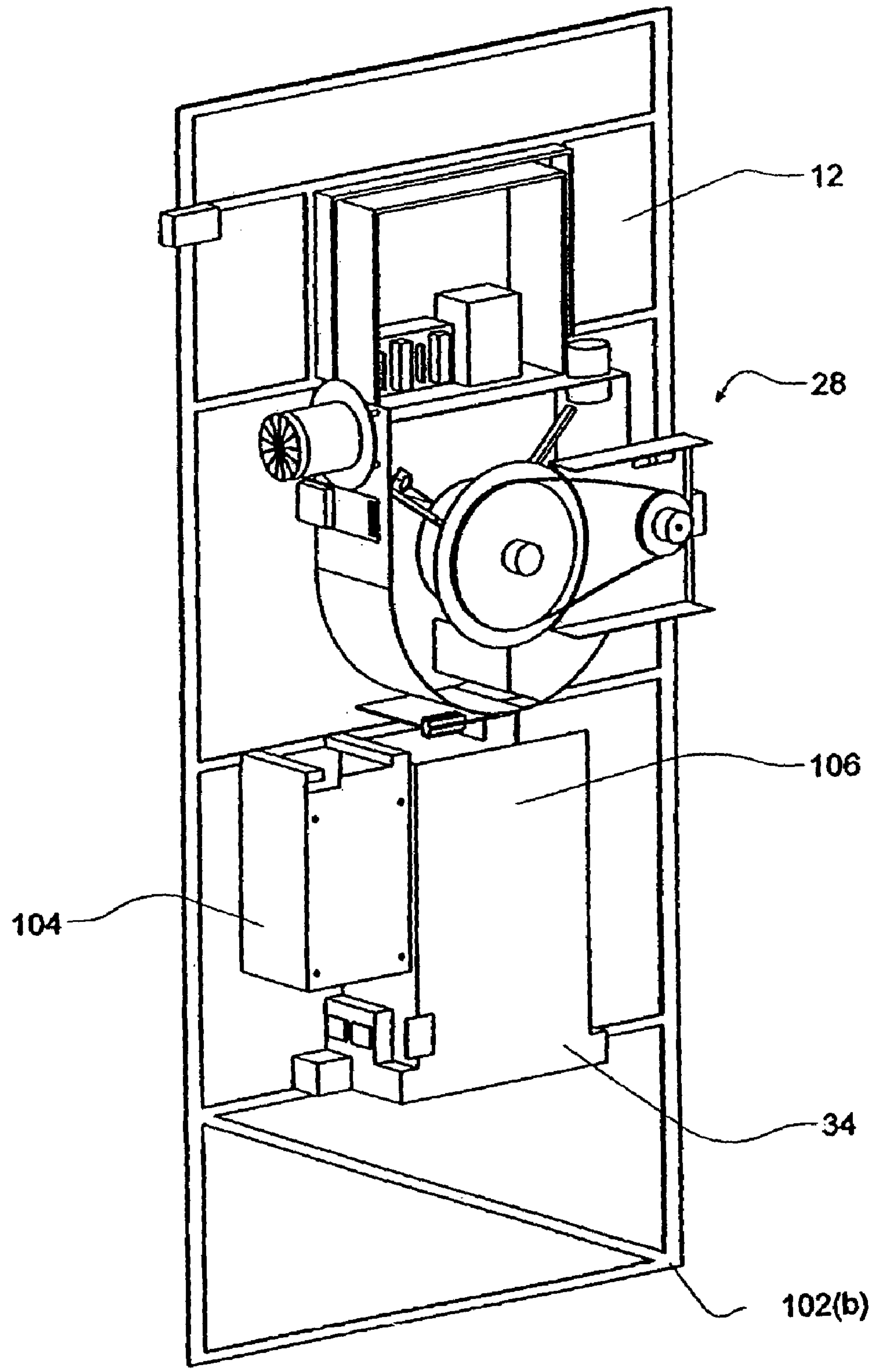
FIG. 9 is a schematic diagram of a blending/filling and weighing means used in the dispensing system shown in FIG. 7.

As shown in FIG. 9, one embodiment of the blending/filling means 28, which are combined in this exemplary embodiment but may be separate, is located on the inside of the door panel 102*b* above the container holder 106, which is above the measuring means 34. The container holder 106 (e.g., the drawer) preferably provides a built-in overflow system. The container dispenser 104 and the computer system 12 can also be located on the inside of the door panel 102*b*.

Figure 10:
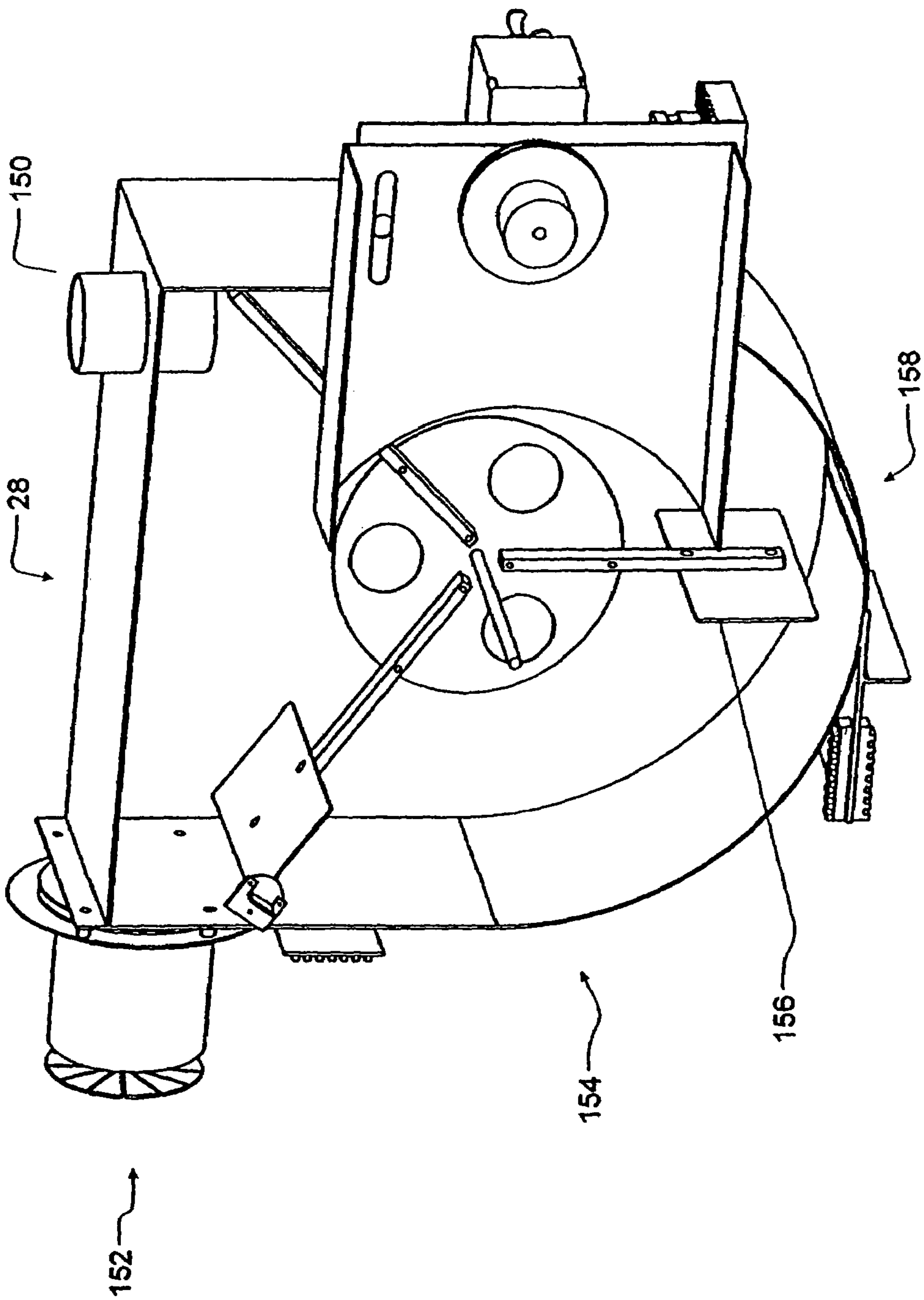
FIG. 10 is a schematic diagram of a blending/filling mechanism used in the dispensing system shown in FIG. 7.

As shown in greater detail in FIG. 10, one embodiment of the blending/filling means 28 includes rotating paddles 156 for blending bulk products within a blending chamber 154. A product outlet 158 allows the blended bulk products to fill a container located in the container holder 106. The product outlet 158 shown is an opening that is covered with a hinged hatch door. The hinged hatch door pivots about its hinges to allow the blended bulk product to pass through the opening. The blending/filling mechanism can also include a motorized dispensing spout (not shown) that adjusts to the bag or container height to ensure precise fill levels with minimal spills. Other embodiments of the blending/filling means known to those skilled in the art are also contemplated.

The end 144 of the collection vacuum hose 142, as shown in FIG. 7, connects to a vacuum inlet 150 on the blending/filling means 28, as shown on FIG. 10. A vacuum 152 is coupled to the blending/filling means 28 for drawing air into the blending chamber 154 through the vacuum inlet 150 to feed bulk products to the blending chamber 154. The vacuum feeding provides a relatively flexible operation.

In using a preferred embodiment of the dispensing system 10, a customer views product information on the user interface 14, selects specified quantities of one or more bulk products using the user interface 14, and places a container in the container holder 106. Based upon the customer's selection, the computer 12 causes one or more of the selective dispensing mechanisms 24 to dispense a measured quantity of bulk product according to the bulk product selected, or the bulk products selected, by the customer. If the customer selects more than one bulk product, the bulk products that are selected are dispensed in the appropriate quantities or doses. To approximate a desired weight of the bulk product or bulk products selected by the customer, the number of doses of bulk product dispensed by the selective dispensing mechanisms 24 can be determined empirically or analytically based on the density of a given bulk product. The vacuum 152 draws the bulk products through the vacuum hose 142 and into the blending chamber 154. After the blending/filling means 28 mixes the bulk products, the hinged hatch door opens the outlet 158 allowing the bulk products to fill the container 30. The computer 12 monitors the measuring means 34 after the container is filled to determine the price of the product according to the distribution and quantity thereof.

While the principles of the present invention have been described herein, it is to be understood by those skilled in the art that this description is made only by way of example and not as a limitation as to the scope of the invention. Other embodiments are contemplated within the scope of the present invention in addition to the preferred embodiments shown and described herein. Modifications and substitutions by one of ordinary skill in the art are considered to be within the scope of the present invention, which is not to be limited except by the following claims.

It is recognized that the dispensing system 10 through the use of coupons printed as part of delivery can create cross promotion of data. It is recognized that the computer 12 can provide both owner/operator business reports and machine status reports; these reports can be printed locally using the printer 38, displayed locally, or sent electronically to another location.

The invention claimed is:

1. A system for dispensing bulk products comprising:

one or more inventory containers for storing one or more bulk products;

a user interface for displaying information on the stored bulk products and for receiving a customer's selection of specified quantities of one or more of the stored bulk products;

one or more selective dispensing means, such that each one is coupled to one inventory container, for selectively dispensing a specified quantity of the bulk product stored in the inventory container;

a computer that is coupled to the user interface and that controls the dispensing means to dispense the customer's selection of specified quantities of one or more of the stored bulk products;

a transporting means coupled to the dispensing means for transporting the specified quantities of one or more of the stored bulk products;

a filling means coupled to the transporting means for filling a container with the specified quantities of one or more of the stored bulk products; and a weighing device coupled to the computer for measuring the container and the specified quantities of one or more of the stored bulk products while in the container to determine the price thereof; and a printer connected to the computer for printing information regarding the dispensed product, wherein the information printed by the printer includes nutritional information.

2. A system of claim 1 wherein the specified quantity of the bulk products that is dispensed is measured by volume.

3. A system of claim 1 wherein the specified quantity of the bulk products that is dispensed is measured by weight.

4. A system of claim 1 further comprising a blending means for blending the customer's selection of specified quantities of one or more of the stored bulk products.

5. A system for dispensing bulk products comprising:

at least two inventory containers for storing at least two bulk products;

a user interface for displaying information on the stored bulk products and for receiving a customer's selection of specified quantities of one or more of the stored bulk products;

at least two selective dispensing means, such that each one is coupled to one inventory container, for selectively dispensing a specified quantity of the bulk product stored in the inventory container;

a controller that is coupled to the user interface and that controls the dispensing means to dispense the customer's selection of specified quantities of one or more of the stored bulk products;

a vacuum transporting mechanism coupled to the dispensing means for transporting by the flow of air the specified quantities of one or more of the stored bulk products;

a blending/filling mechanism coupled to the vacuum transporting mechanism for blending the customer's selection of more than one of the stored bulk products and filling a container with the specified quantities of one or more of the stored bulk products;

a measuring means coupled to the controller for measuring the specified quantities of one or more of the stored bulk products in the container to determine the price thereof; and a printer connected to the computer for printing information regarding the dispensed product, wherein the information printed by the printer includes nutritional information.

6. A system for dispensing bulk products of claim 5 wherein the dispensing device approximates a desired weight of the respective bulk product selected by the customer based on the density of a given bulk product.

7. A system for dispensing bulk products of claim 6 wherein the at least one of the bulk products has a different density than at least one of the other bulk products.

8. A system for dispensing bulk products of claim 6 wherein the user interface for displaying information on the stored bulk products displays nutritional information.

9. A system for dispensing bulk products of claim 5 wherein the at least two inventory containers for storing at least two bulk products are climatically controlled to maintain the quality of the bulk products.

10. A system for dispensing bulk products of claim 9 wherein the climatically controlled inventory containers are temperature controlled.

11. A system for dispensing bulk products of claim 9 wherein the climatically controlled inventory containers are humidity controlled.

12. A system for dispensing bulk products of claim 5 wherein the blending/filling mechanism has a blending chamber and a plurality of paddles for blending the customer's selection of more than one of the stored bulk products.

13. A system for dispensing bulk products of claim 7 wherein the measuring means is a weighing device that measures the specified quantities of one or more of the stored bulk products by weight.

14. A system for dispensing bulk products of claim 13 wherein the weighing device includes a scale for weighing the bulk product in a container after the container is filled, the weighing device coupled to the controller wherein the controller calculates the price based on data including the weight from the weighing device, the specified quantity from the selective dispensing mechanisms for each of the one or more of the stored bulk products selected, and the price associated with each of the one or more of the stored bulk products selected.

15. A system for dispensing bulk products of claim 5 wherein the information printed by the printer includes information associated with a customer loyalty program.

16. A method of dispensing bulk products comprising:

storing one or more bulk products in individual inventory containers;

displaying information on the stored bulk products on a user interface;

receiving on the user interface a customer's selection of specified quantities of one or more of the stored bulk products;

conveying the customer's selection of specified quantities of one or more of the stored bulk products to a computer controlling the dispensing of the stored bulk products;

dispensing the customer's selection of specified quantities of one or more of the stored bulk products;

filling a container with the specified quantities of one or more of the desired bulk products and measuring by weight the container and the specified quantities of one or more of the bulk products while in the container to determine the price thereof; and printing information regarding the dispensed product including nutritional information.

17. A method of claim 16 wherein the specified quantity of the bulk products that is dispensed is measured by volume.

18. A method of claim 16 wherein the specified quantity of the bulk products that is dispensed is measured by weight.

19. A method of claim 16 further comprising blending the customer's selection of specified quantities of one or more of the stored bulk products.

20. A method of claim 16 further comprising storing in the computer for future use the customer's selection of specified quantities of one or more of the stored bulk products.

* * * * *